(12) United States Patent
Lee et al.

(10) Patent No.: US 8,411,142 B2
(45) Date of Patent: Apr. 2, 2013

(54) INTELLECTUAL SURVEILLANCE SYSTEM AND MONITORING METHOD THEREOF

(75) Inventors: Che-Yen Lee, Taipei (TW); Wen-Chi Wang, Taipei (TW); Julian Lin, Taipei (TW)

(73) Assignee: VTC Electronics Corp. (TW)

( * ) Notice: Subject to any disclaimer, the term of this patent is extended or adjusted under 35 U.S.C. 154(b) by 542 days.

(21) Appl. No.: 12/768,916

(22) Filed: Apr. 28, 2010

(65) Prior Publication Data

US 2011/0157364 A1    Jun. 30, 2011

(30) Foreign Application Priority Data

Dec. 30, 2009 (TW) ................................ 98145841 A

(51) Int. Cl.
*H04N 7/18* (2006.01)
(52) U.S. Cl. ........................................................ 348/143
(58) Field of Classification Search ............ 348/143, 348/152
See application file for complete search history.

(56) References Cited

U.S. PATENT DOCUMENTS

2002/0190682 A1* 12/2002 Schempf et al. ......... 318/568.11
2004/0061780 A1*  4/2004 Huffman ...................... 348/148

* cited by examiner

*Primary Examiner* — Christopher S Kelley
*Assistant Examiner* — Zhen Jessica Li

(57) ABSTRACT

The present invention relates to an intellectual surveillance system and a monitoring method thereof. The intellectual surveillance system comprises a camera module and a terminal computer module, wherein the camera module is capable of monitoring and reacting various sudden situations, and then the camera module transmits images and messages of the situations to the terminal computer module through at least one BNC connector and at least one coaxial cable, further that, the terminal module is able to display the images and show a alert so as to complete a secure monitor without any RS-485 series communication port and digital IP camera. Besides, the intellectual surveillance system can control the actions of monitoring and reacting such situations automatically by using the monitoring method.

16 Claims, 13 Drawing Sheets

INTELLECTUAL SURVEILLANCE SYSTEM AND MONITORING METHOD THEREOF

CROSS-REFERENCE TO RELATED APPLICATION

This application claims foreign priority from a Taiwan Patent Application, Ser. No. 098145841, filed on Dec. 30, 2009.

BACKGROUND OF THE INVENTION

1. Technical Field

The present invention relates to surveillance systems, and more particularly, to an intellectual surveillance system and a monitoring method thereof, that is provided with a camera module and a terminal computer module for monitoring and reacting various sudden situations.

2. Description of Related Art

Recently, a surveillance camera system is generally applied in different fields of security camera, such as entrance guard, invading detection, elderly care, and alley monitor. Traditionally, each field of security is independent and has its won professional tools, such as camera devices, transmission cables, terminal computers, etc.

With the advancement of the technology, a security camera system consisting of a surveillance camera and an intellectual procession is proposed, and is able to execute invading detection by way of motion detection; moreover, the security camera system can also determine whether the fire accident is happening by smoke detection. However, the security camera system with the surveillance camera and the intellectual procession usually carries high-price IP digital cameras, so that the security camera system can not be broadly applied.

Besides, in opposition to the IP digital camera, the price of a traditional analog monitor is inexpensive; but the traditional analog monitor can not carry non-video message due to the limitation of the video transmission format thereof. For this reason, the traditional analog monitor can not be used as the surveillance camera with the intellectual process. Wherein the non-video message can be a normal message of the main body of the surveillance camera and a warning message outputted from a sensing device, for example, the non-video message as follows: violent vibration of the video, the main body of the surveillance camera being subject to damage, the motion detection of an object, or other text and picture message.

Although the traditional analog camera is able to transmit the non-video message to the terminal computer by using the RS485 serial communication, the terminal computer is almost industry computer which can not satisfy the demands of multi camera channels due to the limited serial communication ports thereof. Moreover, the transmission cable of the RS485 serial communication is different from the transmission cable of the traditional analog camera, so that the equipment cost would extremely high when using the traditional analog camera and the RS485 serial communication to be the security camera system for executing monitoring and intellectually process.

Accordingly, in view of the drawbacks and shortcomings of the aforesaid conventional security camera system, the inventor of the present application has made great efforts to make inventive research thereon and eventually provided an intellectual surveillance system and monitoring method thereof according to the present invention.

SUMMARY OF THE INVENTION

The primary objective of the present invention is to provide an intellectual surveillance system, which uses a camera module to monitor and react various sudden situations and transmits the sudden situation to a terminal computer module through at least one BNC connector and at least one coaxial cable, further that, the terminal module is able to display the images and show an alert message so as to complete a secure camera without any RS-485 series communication ports and digital IP cameras, thereafter, the equipment cost of the surveillance system can be decreased.

Another objective of the present invention is to provide a monitoring method for an intellectual surveillance system that is able to control the intellectual surveillance system to automatically complete monitoring and reacting various of sudden situations.

Accordingly, to achieve the abovementioned primary objective of this invention, the inventor proposes an intellectual surveillance system, which comprises: at least one camera module and a terminal computer module, wherein the camera module is adapted to react a sudden situation and integrate the sudden situation into a second composite video signal, and then the camera module outputs the second composite video signal through at least one BNC connector and at least one coaxial cable, the camera module comprises: a surveillance camera, a periphery sensing device, a first microprocessor, a synchronizing signal separator, a message register, and a data mixer, wherein the surveillance camera can output a first composite video signal, which is the image data taken by the surveillance camera, moreover, the surveillance camera has a state register for saving a first situation message; the periphery sensing device is able to sense the sudden situation of the surveillance camera and outputs a second situation message; the first microprocessor is adapted to receive the first situation message and the second situation message and encodes the communication protocol of the first situation message and the second situation message; the synchronizing signal separator is capable of separating the first composite video signal into a horizontal synchronized signal, a vertical synchronized signal and an odd-even video field signal; the message register is used to receive and save the first situation signal and the second situation signal dealt with the communication protocol; the data mixer can receive the horizontal synchronized signal, the vertical synchronized signal, the odd-even video field signal, the first situation message, and the second situation message, so that the data mixer integrates the horizontal synchronized signal, the vertical synchronized signal, the odd-even video field signal, the first situation message, and the second situation message into the second composite video signal, and outputs the second composite video signal.

The terminal computer is electrically connected to the camera module through the BNC connector and the coaxial cable for receiving and processing the second composite video signal, the terminal computer comprises: a data separator, a video decoder, a second microprocessor, a warning device, and a core processor, wherein the data separator is adapted to receive and separate the second composite video signal into the first situation message, the second situation message and the first composite video signal; the video decoder processes the first composite video signal as a digital video signal, and outputs the digital video signal; the second microprocessor is able to decode the communication protocol of the first situation message and the second situation message and outputs an alert signal and a normal signal; the warning device is capable of receiving the alert signal and sending out an alert to warn; the core processor receives and processes the digital video signal, the normal signal and the alert signal, so that the core processor processed and outputs the digital video signal, the normal signal and the alert signal to an external display, wherein the display shows video image and an alert message at the sudden situation, shows the video image and a normal message at a normal situation.

Moreover, to achieve the abovementioned primary objective of this invention, the inventor proposes a monitoring method for the intellectual surveillance system, wherein the monitoring method comprises the following steps of: (1) a surveillance camera being activated for monitoring and outputting a first composite video signal; (2) a periphery sensing device detecting the state of the surveillance camera; (3) determining whether a sudden situation is happening, if yes, going to step (4), if not, going to step (18); (4) determining whether the sudden situation is detected by the surveillance camera, if yes, going to step (5), if not, going to step (6); (5) a state register saving and outputting a first situation message of the surveillance monitor, going to step (7); (6) the periphery sensing device outputting a second situation message; (7) a first microprocessor receiving and determining the first situation message and the second situation message; (8) determining whether the message is set up, if yes, going to step (9), if not, going back to step (1); (9) the first microprocessor encoding the communication protocol and setting the priority process of the first situation message and the second situation message; (10) the first microprocessor outputting the first situation message and the second situation message to a message register, and resetting the message process sequence of the message register; (11) the message register sending out the first situation message and the second situation message firstly; (12) a synchronizing signal separator receiving the first composite video signal and separating the first composite video signal into a horizontal synchronized signal, a vertical synchronized signal and an odd-even video field signal, then outputting the horizontal synchronized signal, the vertical synchronized signal and the odd-even video field signal; (13) a data mixer receiving the horizontal synchronized signal, the vertical synchronized signal and the odd-even video field signal and mixing the horizontal synchronized signal, the vertical synchronized signal and the odd-even video field signal as a second composite video signal, so that the second composite video signal is outputted; (14) a terminal computer module receiving and processing the second composite video signal; (15) a display showing video image and alert messages, and a warning device sending out an alert to warn simultaneously; (16) determining whether the alert message is being finished, if yes, going to step (17), if not, going back to step (15); (17) changing the setting of the terminal computer module so as to make the display merely display the video image; and (18) the periphery sensing device and the state register both executing the message return of a normal situation.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe an intellectual surveillance system and a monitoring method thereof according to the present invention, an embodiment of the present invention will be described in detail with reference to the attached drawings hereinafter.

Figure 1:
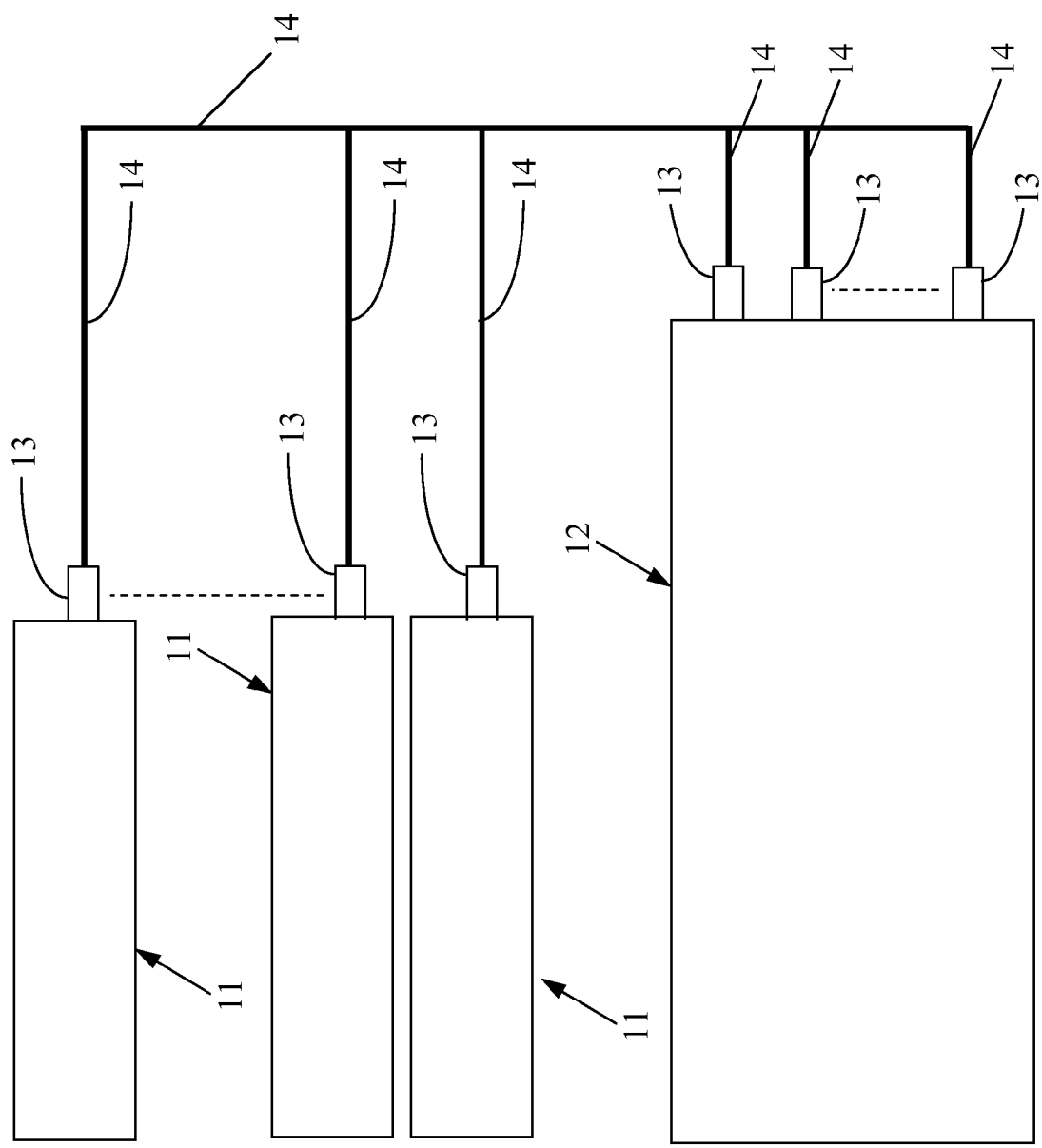
FIG. 1 is a structure diagram of an intellectual surveillance system according to the present invention.

Referring to FIG. 1, which illustrates a structure diagram of an intellectual surveillance system according to the present invention, the intellectual surveillance system 1 comprises: at least one camera module 11, which is adapted to monitor and react a sudden situation, furthermore, to integrate the sudden situation into a second composite video signal so as to output that through at least one Bayonet Nut Connector (BNC) connector 13 and at least one coaxial cable 14; and a terminal computer module 12, which electrically connects to the camera module 11 via the BNC connector 13 and the coaxial cable 14 for receiving and processing the second composite video signal.

Figure 2:
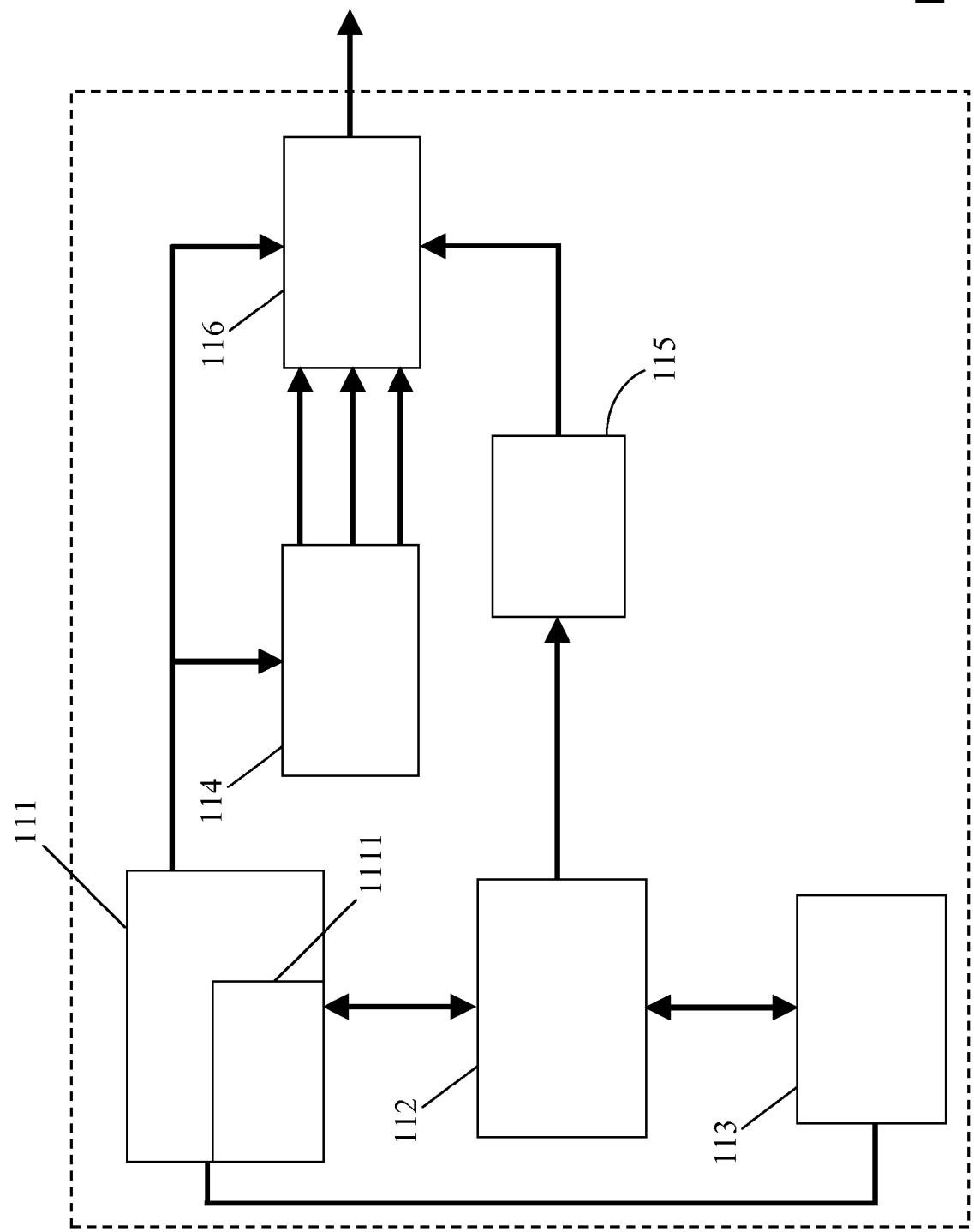
FIG. 2 is the structure diagram of a camera module of the intellectual surveillance system.

Referring to FIG. 2, which illustrates the structure diagram of the monitor module of the intellectual camera system, the camera module described above includes: a surveillance camera 111, a periphery sensing device 113, a first microprocessor 112, a synchronizing signal separator 114, a message register 115, and a data mixer 116. The surveillance camera 111 is an analog camera, which is adapted to monitor and output a first composite video signal with the first composite video signal has a vertical blanking interval and a video interval, moreover, the surveillance camera 111 has a state register 1111 which saves the sudden situation as a first situation message, the state register 1111 further save a normal situation of the surveillance camera 111 to as the first situation message.

The periphery sensing device 113 is coupled to the surveillance camera 111 for detecting the sudden situation and outputs a second situation message. The periphery sensing device 113 also detects the normal situation of the surveillance camera 111 and outputs the second situation message; The first microprocessor 112 is coupled to the surveillance camera 111 and the periphery sensing device 113, wherein the first microprocessor 112 receives the first situation message and the second situation message and encodes the communication protocol of the first situation message and the second situation message; The synchronizing signal separator 114 is coupled to the surveillance camera 111 for receiving and separating the first composite video signal into a horizontal synchronized signal, a vertical synchronized signal and an odd-even video field signal; The message register 115 is coupled to the first microprocessor 112 to receive and save the first situation message and the second situation message; The data mixer 116 is coupled to the synchronizing signal separator 114, the surveillance camera 111 and the message register 115, wherein the data mixer 116 receives and integrates the horizontal synchronized signal, the vertical horizontal synchronized signal, the odd-even video field signal, the first situation message, and the second situation message into the second composite video signal, and then the data mixer 116 outputs the second composite video signal, wherein the first situation message and the second situation message are integrated within the vertical blanking interval (VBI).

Figure 3:
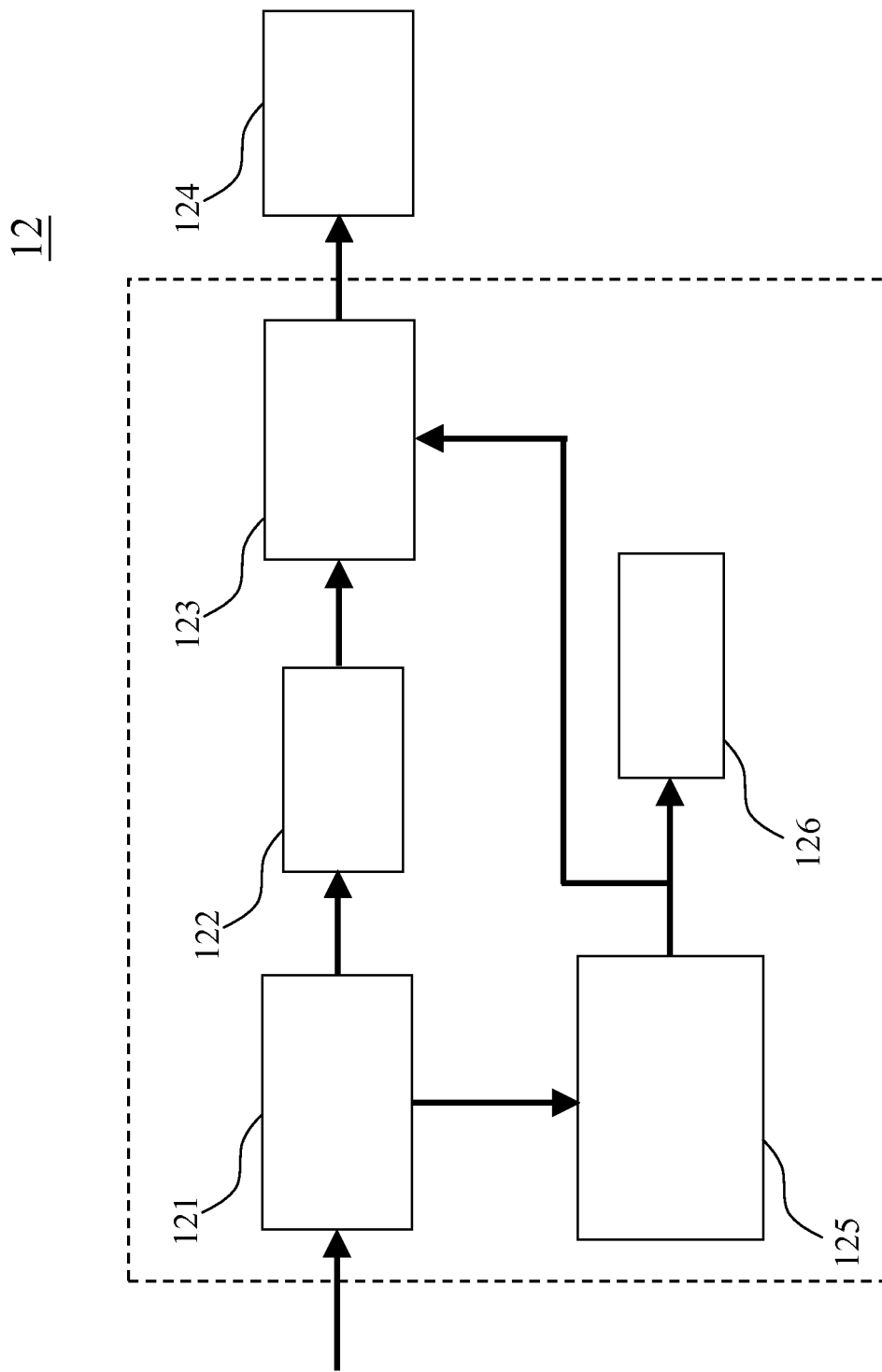
FIG. 3 is the structure diagram of a terminal computer module of the intellectual surveillance system.

Referring to FIG. 3, which illustrates the structure diagram of the terminal computer module of the intellectual surveillance system, the terminal computer module 12 described above includes: a dada separator 121, a video decoder 122, a second microprocessor 125, a warning device 126, and a core processor 123. The data separator 121 is electrically connected to the data mixer 116 to receive and separate the second composite video signal into the first situation message, the second situation message and the first composite video signal; The video decoder 122 is coupled to the data separator 121 for receiving and processing the first composite video signal so as to output a digital video signal; The second microprocessor 125 is coupled to the data separator for receiving the first situation message and the second situation message, so that the second microprocessor 125 outputs the first situation message and the second situation message after decoding the communication protocol of the first situation message and the second situation message, moreover, the second microprocessor 125 outputs an alert signal simultaneously; Besides, the second microprocessor 125 outputs a normal signal when the subject matter of the first situation message and the second situation message is the normal situation.

The warning device 126 is coupled to the second microprocessor 125 for receiving the alert signal and sending out an alert to warn; The core processor 123 is coupled to video decoder 122 and the second microprocessor 125 to receive and process the digital video signal, the normal signal and the alert signal, so that the core processor 123 outputs the digital video signal, the normal signal and the alert signal to an external display 124. Wherein the display 124 can be an LCD display, an LED display, a PDP display, or a CRT display, and superiorly, the display 124 is the LCD display at the embodiment according to this invention. The display 124 receives the digital video signal and the alert signal processed by the core processor 123 and shows video image and an alert message with the sudden situation; Further that, the display 124 receives the digital video signal and the normal signal processed by the core processor 123 and shows the video image and a normal message without the sudden situation; Wherein the alert message and the normal message can both be a text message, picture message or text-picture message.

Figure 4:
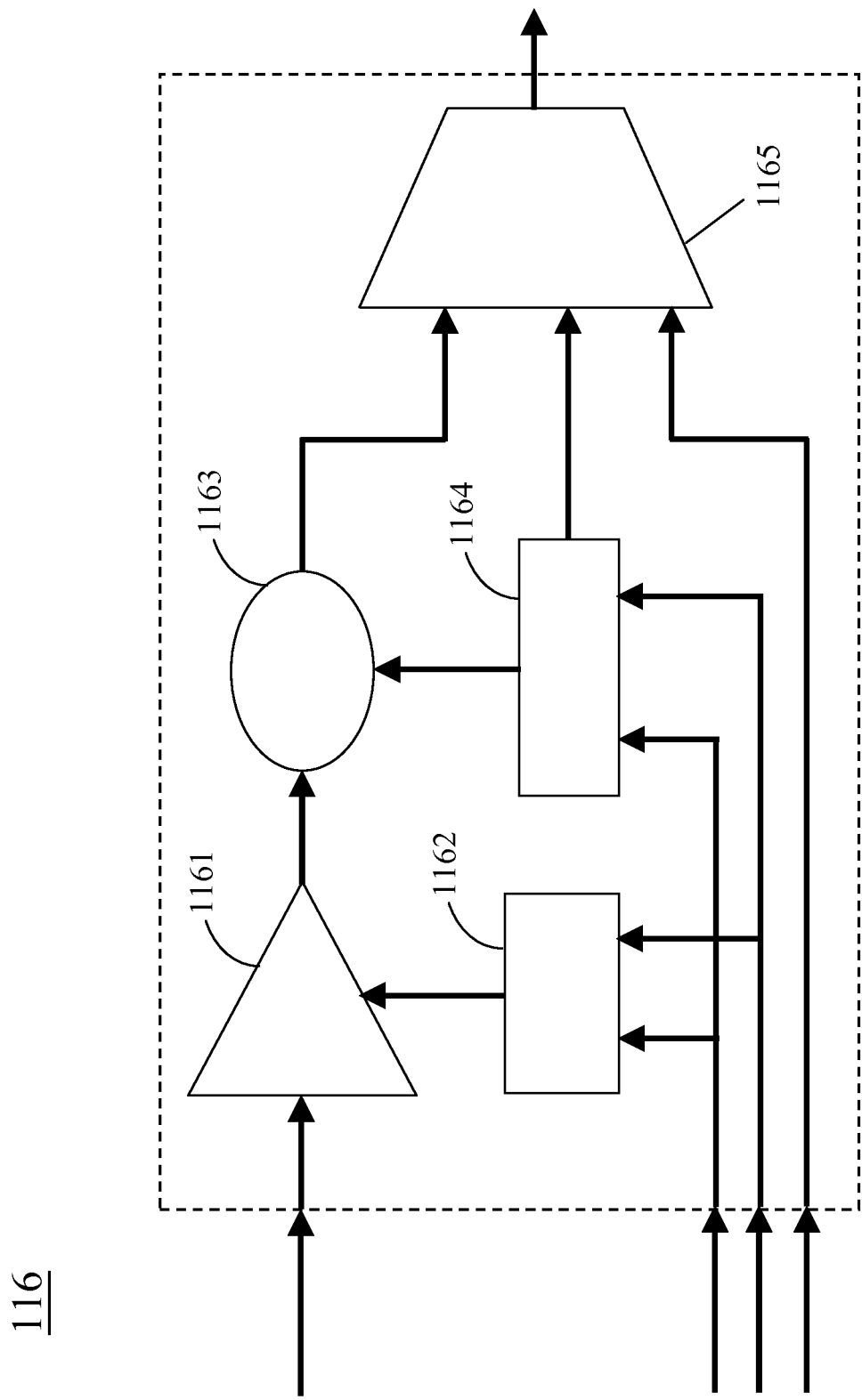
FIG. 4 is an internal structure diagram of a data mixer of the camera module.
Figure 5:
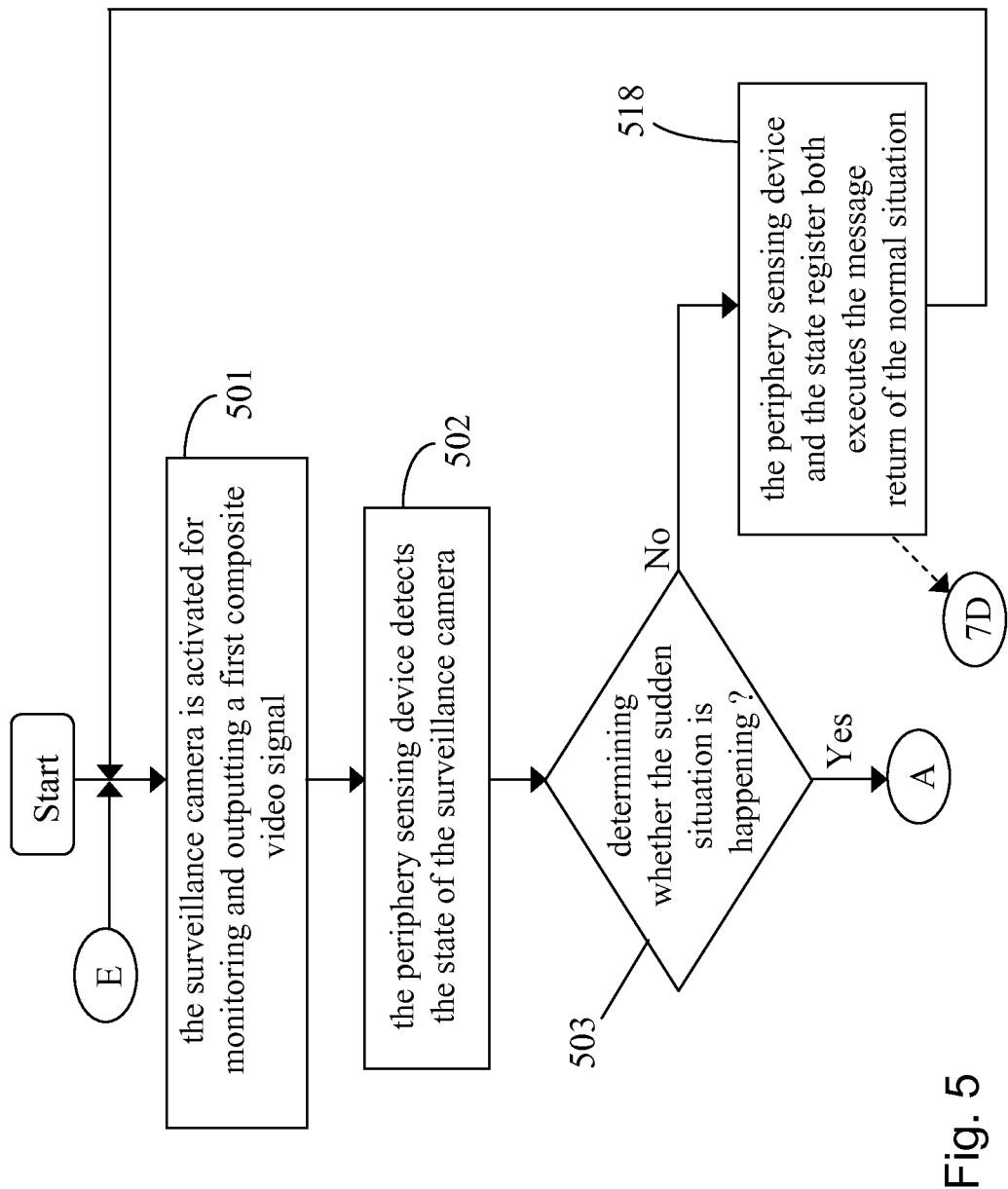
FIGS. 5, 6, 7, and 8 are a flow chart diagram of a monitoring method for the intellectual surveillance system according to the present invention.
Figure 6:
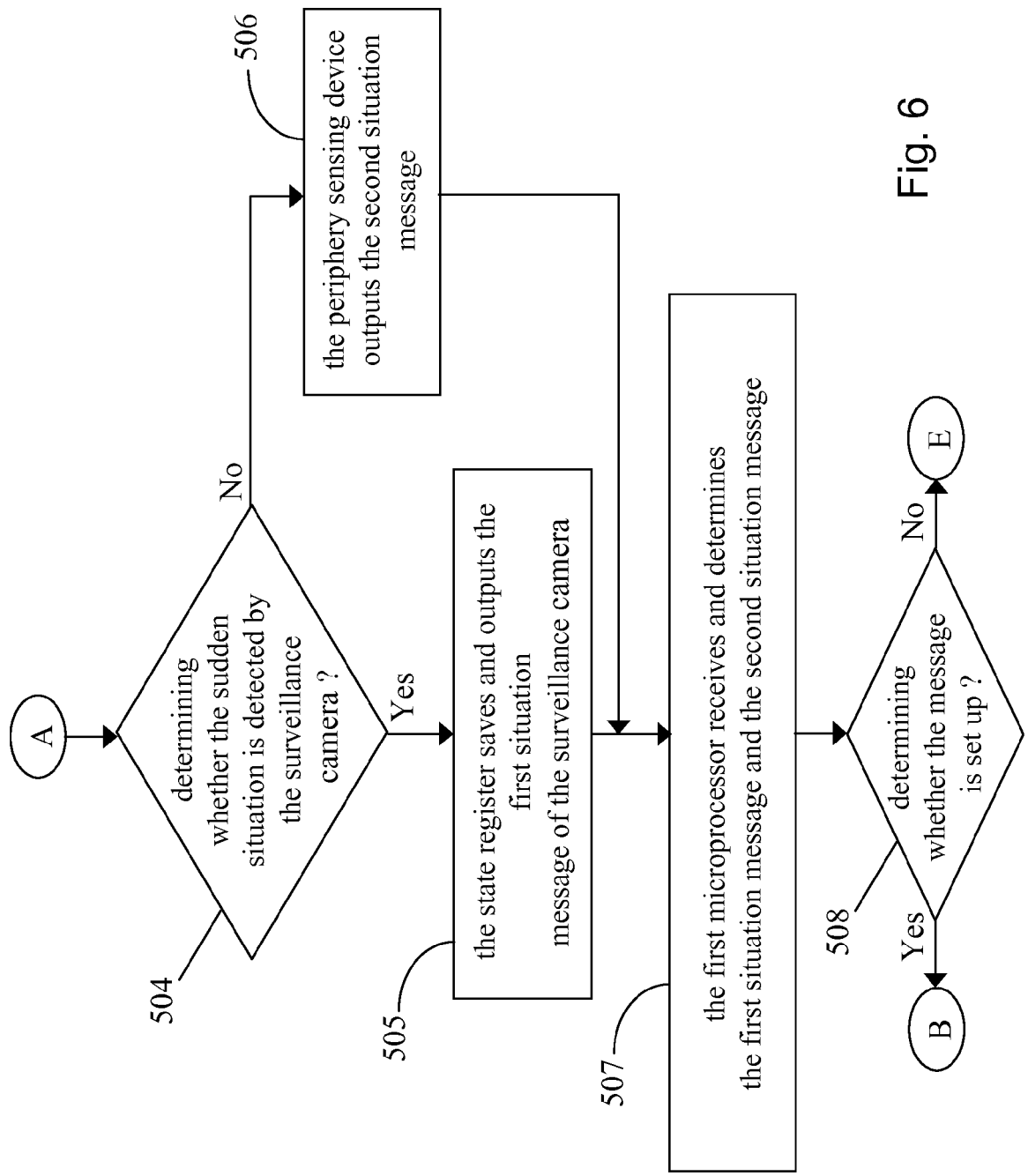
Figure 7:
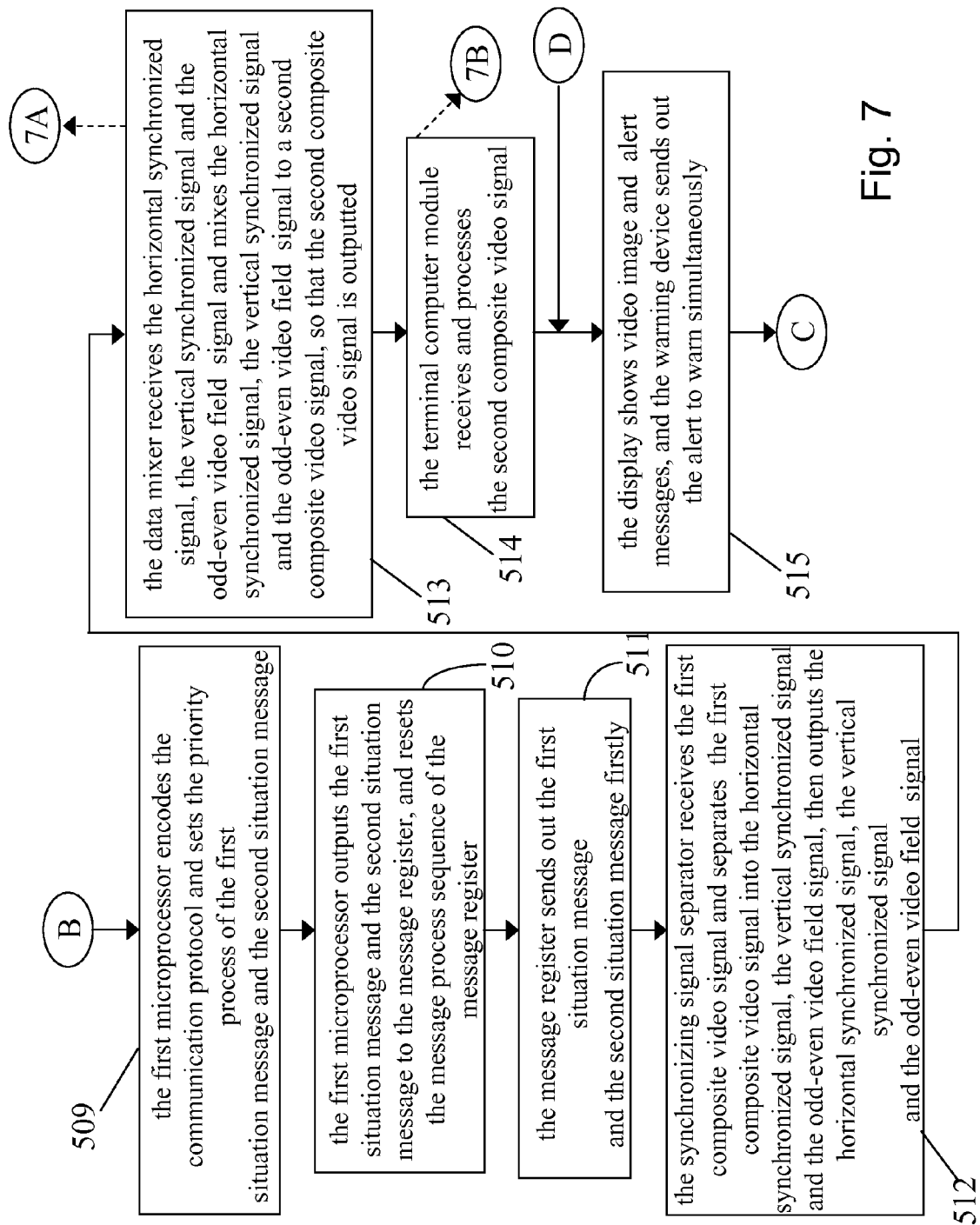
Figure 8:
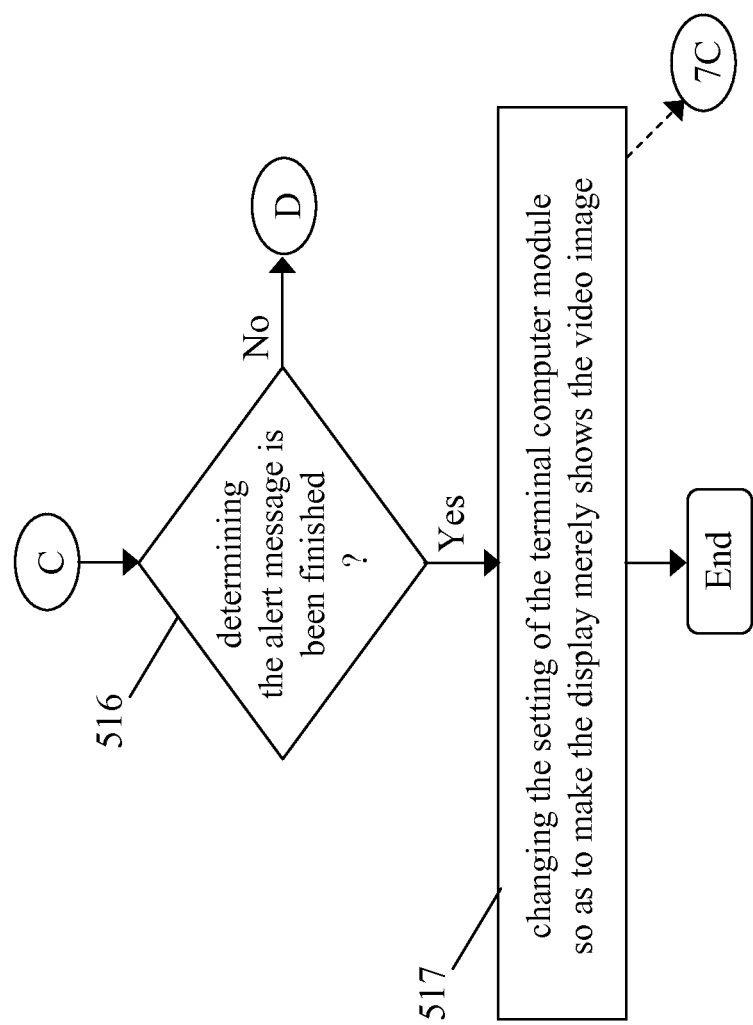

Referring to FIG. 4, which illustrates an internal structure diagram of the data mixer of the monitoring module, the data mixer 116 described above includes: a data reading gate 1161, a reading trigger 1162, a vertical synchronization generator 1164, an adder 1163, and an output selecting gate 1165, wherein the data reading gate 1161 is electrically connected to the message register 115 for receiving the first situation message and the second situation message; The reading trigger 1162 is electrically connected to the synchronizing signal separator 114 and couples to the data reading gate 1161, so that reading trigger 1162 receives the horizontal synchronized signal and the vertical synchronized signal and triggers the data reading gate 1161 to output the first situation message and the second situation message according to the period of the horizontal synchronized signal and the vertical synchronized signal; The vertical synchronization generator 1161 is electrically connected to the synchronizing signal separator 114 and receives the horizontal synchronized signal and the vertical synchronized signal, so that the period of the vertical blanking interval is determined and a output control signal is outputted by the synchronizing signal separator 114; The adder 1163 is coupled to the data reading gate 1161 and the vertical synchronization generator 1164, wherein the adder 1163 is adapted to receive the first situation message and the second situation message and obtain the period of the vertical blanking interval via the vertical synchronization generator 1164, and then the adder 1163 couples the first situation message and the second situation message into a synchronized signal of the VBI; The output selecting gate 1165 is coupled to the adder 1163 and the vertical synchronization generator 1164 for receiving the horizontal synchronized signal and vertical synchronized signal with the first situation message and the second situation message, the output selecting gate 1165 further receives the odd-even video field signal and the control signal simultaneously, so that the output selecting gate 1165 outputs the first situation message and the second situation message in the vertical blanking interval (VBI) according to the control signal and outputs the odd-even video field signal which is a pure video signal except in the VBI.

The intellectual surveillance system 1 as abovementioned is capable of monitoring and reacting various sudden situations by using multi surveillance camera. Generally, the sudden situation could be following situations: a moving object is detected by the surveillance camera, the video brightness of the surveillance camera is changed, the day/night mode of the surveillance camera is switched, the capturing angle of the surveillance camera is changed, the lens of the surveillance camera is shielded, and the surveillance camera is subject to damage. For instance, the moving object suddenly gets into the capturing region of the surveillance camera 111, or a dense smoke abruptly occurs in the capturing region of the surveillance camera 111, in this moment, the surveillance camera 111 reacts the sudden situation that is "the moving object detected by the surveillance camera", so that the sate register 1111 saves the sudden situation as the first situation message and outputs the first situation message to the first microprocessor 112 for processing; Moreover, when the sudden situation occurs and that is "the video brightness of the surveillance camera is changed", "the day/night mode of the surveillance camera is switched" or "the surveillance camera is subject to damage", meanwhile, the periphery sensing device 113 immediately detects the sudden situation and sends the second situation message out to the first microprocessor 112. The periphery sensing device 113 and the state register 1111 further regularly returns the information about the normal situation without the sudden situation; In general, the normal situation could be following situations: the focus situation of the surveillance camera and the periphery temperature situation of the surveillance camera.

The intellectual monitoring system 1 has been completely disclosed in above mention, furthermore, a monitoring method for controlling the intellectual surveillance system 1 to automatically react various sudden situations that will be completely disclosed as following description. Referring to FIGS. 5, 6, 7, and 8, which illustrate a flow chart diagram of the monitoring method for the intellectual surveillance system according to the present invention, wherein the monitoring method for the intellectual surveillance system includes the following steps of: firstly, the method begins with step (501), the surveillance camera 111 is activated for monitoring and outputting the first composite video signal. Then in step (502), the periphery sensing device 113 detects the state of the surveillance camera 111. Next in step (503), determining whether the sudden situation is happening, if yes, going to step (504), determining whether the sudden situation is detected by the surveillance camera 111, if yes, going to step (505), the state register 1111 saves and outputs the first situation message of the surveillance camera 111, if not, going to step (506), the periphery sensing device 13 outputs the second situation message. After the step (505) being executed, the step (507) is next executed, where the first microprocessor 112 receives and determines the first situation message and the second situation message. Then in step (508), determining whether the message is set up, if yes, going to step (509), the first microprocessor 112 encodes the communication protocol and sets the priority process of the first situation message and the second situation message, if not, going back to repeat step (501). After executing the step (509), next in step (510), where the first microprocessor 112 outputs the first situation message and the second situation message to the message register 115 and resets the message process sequence of the message register 115. Next in step (511), the message register 115 sends the first situation message and the second situation message out firstly. Then in step (512), the synchronizing signal separator 114 receives the first composite video signal so as to separate the first composite video signal into the horizontal synchronized signal, the vertical synchronized signal, and the odd-even video field signal and output the horizontal synchronized signal, the vertical synchronized signal, and the odd-even video field signal. Next in step (513), the data mixer 116 receives the horizontal synchronized signal, the vertical synchronized signal, the odd-even video field signal, the first situation message, and the second situation message and mixes the horizontal synchronized signal, the vertical synchronized signal, the odd-even video field signal, the first situation message as the second composite video signal, and then the data mixer 116 outputs the second composite video signal. After completing the step (513), the camera module 11 outputs the second composite video signal to the terminal computer module 12 through the BNC connector 13 and the coaxial cable 14. Continuously going to step (514), the terminal computer module 12 receives and processes the second composite video signal. Then in step (515), the display 124 shows the video image and the alert message, meanwhile, the warning device sends out the alert to warn. So that, according to the video image, a user can get the practical situation of the monitoring region monitored by the surveillance camera 111, moreover, the user is able to immediately obtain the sudden situation from the alert message. After the step (515) being executed, next in step (516), determining the alert message has been finished, if yes, going to step (517), changing the setting of the terminal computer module 12 so as to make the display 12 merely display the video image, if not, going back to repeat the step (515) for continuously displaying the alert message. Finally, in the discrimination of the step (503), if not, it implies that the surveillance camera 111 not detects any the sudden situation, then going to step (518), the periphery sensing device 113 and the sate register 1111 both executes the information return of the normal situation.

Figure 9:
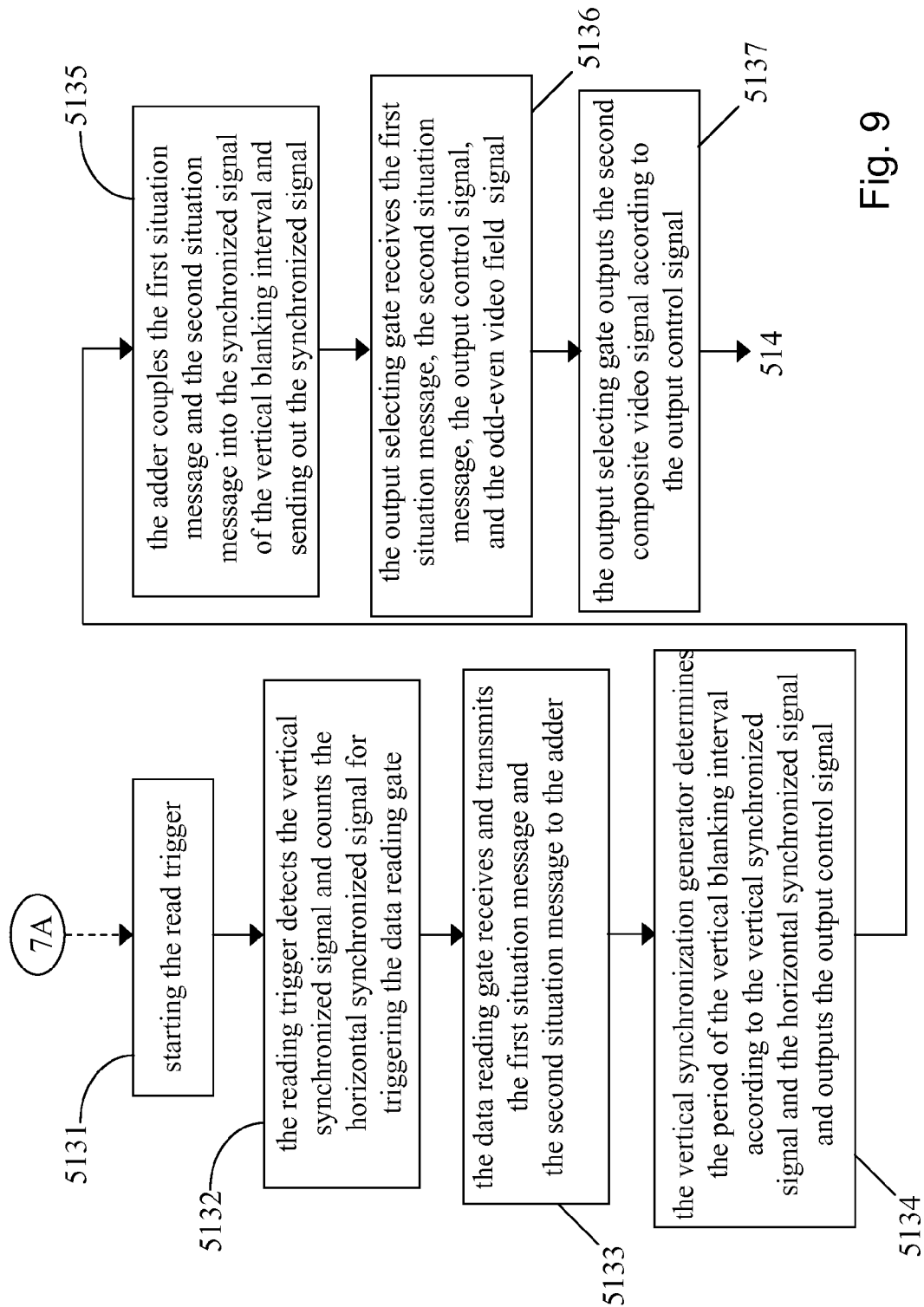
FIG. 9 is a detailed flowchart of step (513) according to the present invention.

Furthermore, referring to FIG. 9, which illustrates a detailed flowchart of step (513) according to the present invention, in the monitoring method for the intellectual surveillance system described above, where the step (513) further includes the following detailed steps:

a. Firstly, executing the step (5131), starting the reading trigger 1162. Then in step (5132), the reading trigger 1162 detects the vertical synchronized signal and counts the horizontal synchronized signal so as to trigger the data reading gate 1161. Next in step (5133), the data reading gate 1161 receives and transmits the first situation message and the second situation message to the adder 1163. Next in step (5134), the vertical synchronization generator 1164 determines the period of the vertical blanking interval (VBI) according to the vertical synchronized signal and the horizontal synchronized signal. Then in step (5135), the adder 1163 couples the first situation message and the second situation message into a synchronized signal of the VBI and outputs the synchronized signal. Next in step (5136), the output selecting gate 1165 receives the first situation message, the second situation message, the output control signal, and the odd-even video field signal. Finally, the method executes step (5137), where the output selecting gate 1165 outputs the second composite video signal according to the output control signal.

Figure 10:
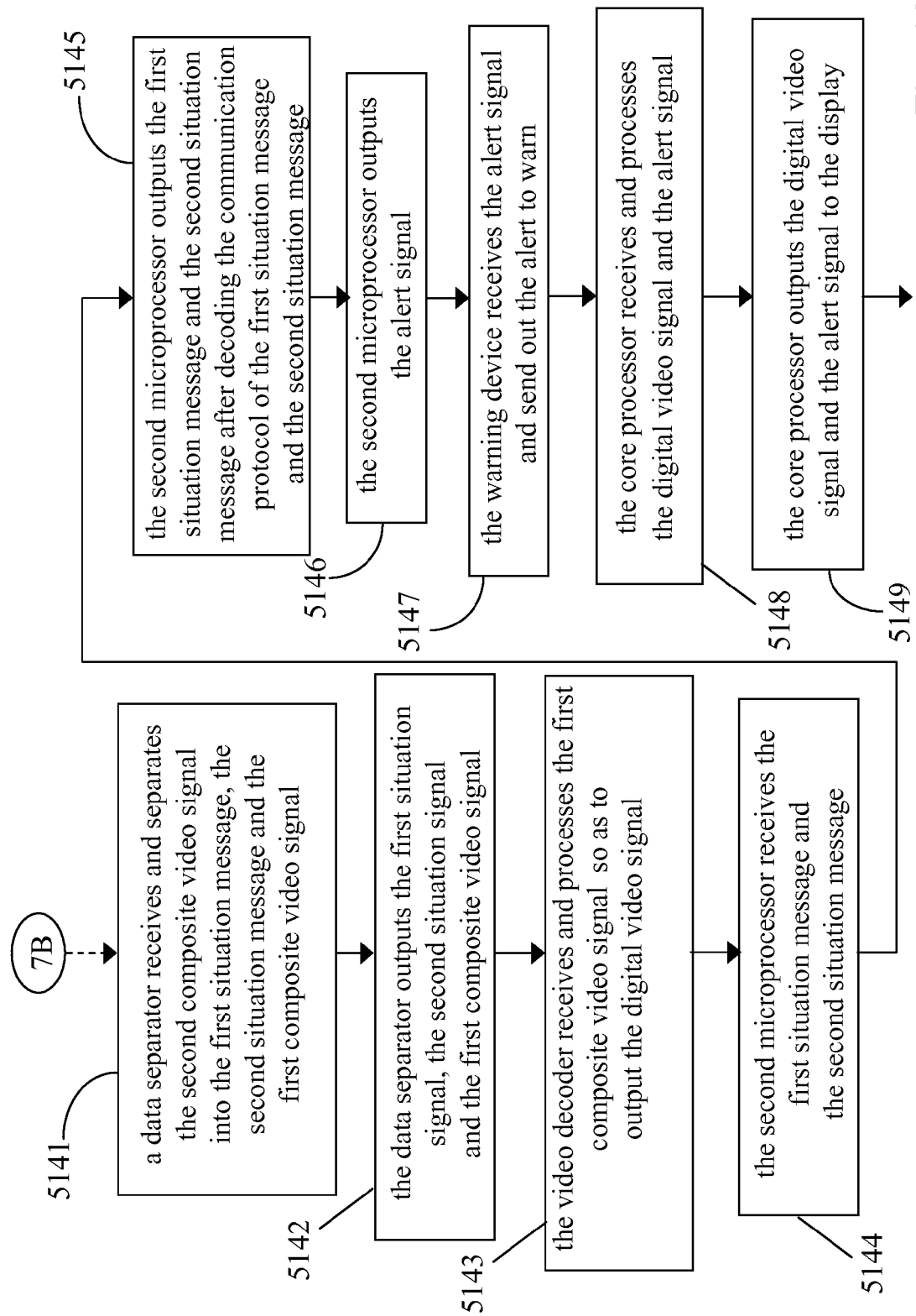
FIG. 10 is the detailed flowchart of step (514) according to the present invention.

Moreover, referring to FIG. 10, which illustrates the detailed flowchart of step (514) according to the present invention, as the monitoring method for the intellectual surveillance system described above, the step (514) further includes the following detailed steps:

At first, the method executes step (5141), where the data separator 121 receives and separates the second composite video signal into the first situation message, the second situation message and the first composite video signal. Then in step (5142), the data separator 121 outputs the first situation message, the second situation message and the first composite video signal. Next in step (5143), the video decoder 122 receives and processes the first composite video signal as a digital video signal for outputting the digital video signal. Next in step (5144), the second microprocessor 125 receives the first situation message and the second situation message. Then in step (5145), the second microprocessor 125 outputs the first situation message and the second situation message after decoding the communication protocol of the first situation message and the second situation message. Next in step (5146), the second microprocessor 125 outputs the alert signal, and then in step (5147), the warning device 126 receives the alert signal and sends out the alert to warn. The method continuously executes step (5148), where the core processor 123 receives and processes the digital video signal and the alert signal. Finally, in step (5149), the core processor 123 outputs the digital video signal and the alert signal to the display 124.

Figure 11:
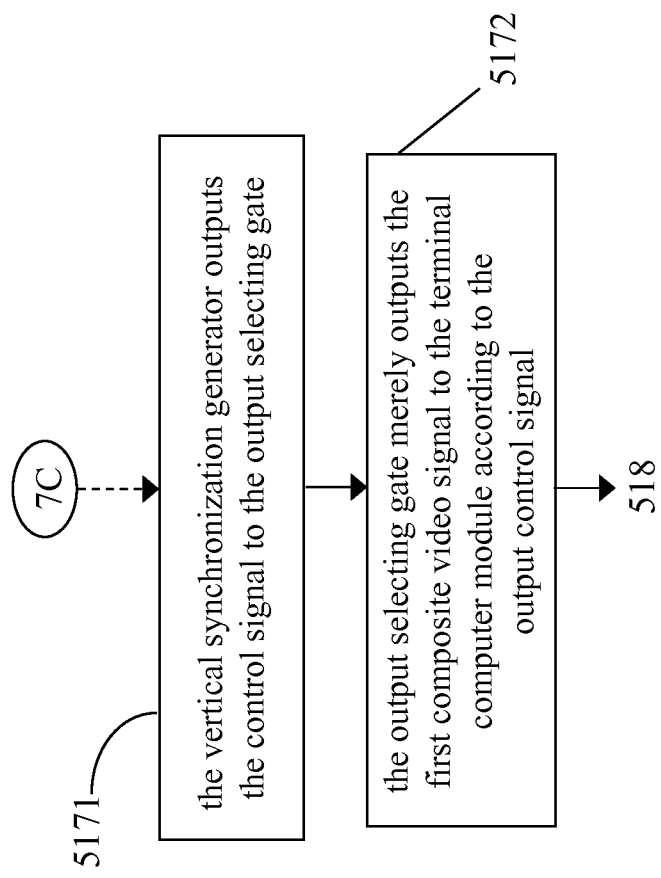
FIG. 11 is the detailed flowchart of step (517) according to the present invention.

Continuously referring to FIG. 11, which illustrates the detailed flowchart of step (517) according to the present invention, as the monitoring method for the intellectual surveillance system described above, the step (517) further includes the following detailed steps:

Firstly, the method executes step (5171), where the vertical synchronization generator 1164 outputs the control signal to the output selecting gate 1165. Then in step (5172), based on the output control signal, the output selecting gate 1165 merely output the first composite video signal to the terminal computer module 12.

Figure 12:
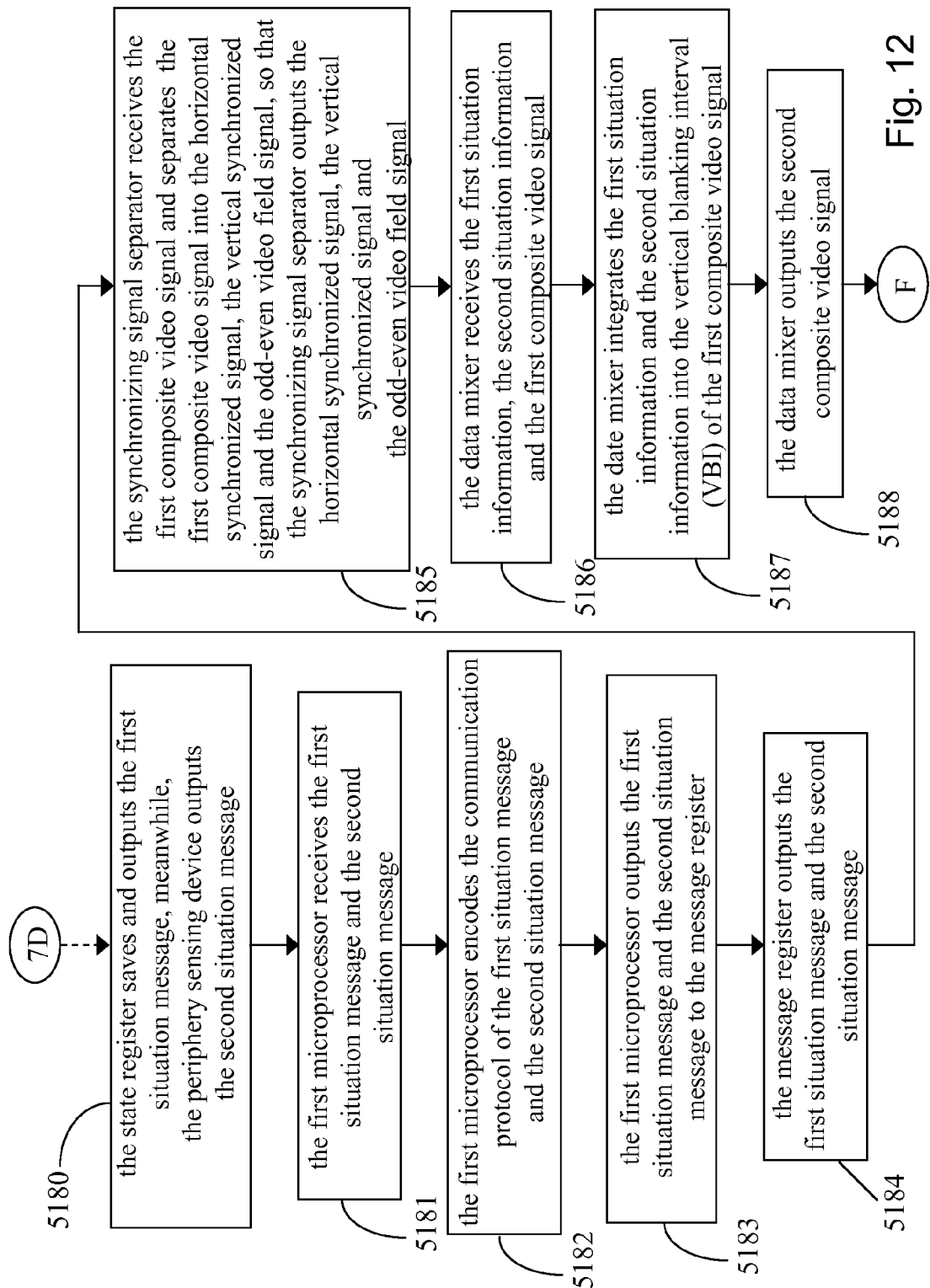
FIGS. 12 and 13 are the detailed flowchart of step (518) according to the present invention.
Figure 13:
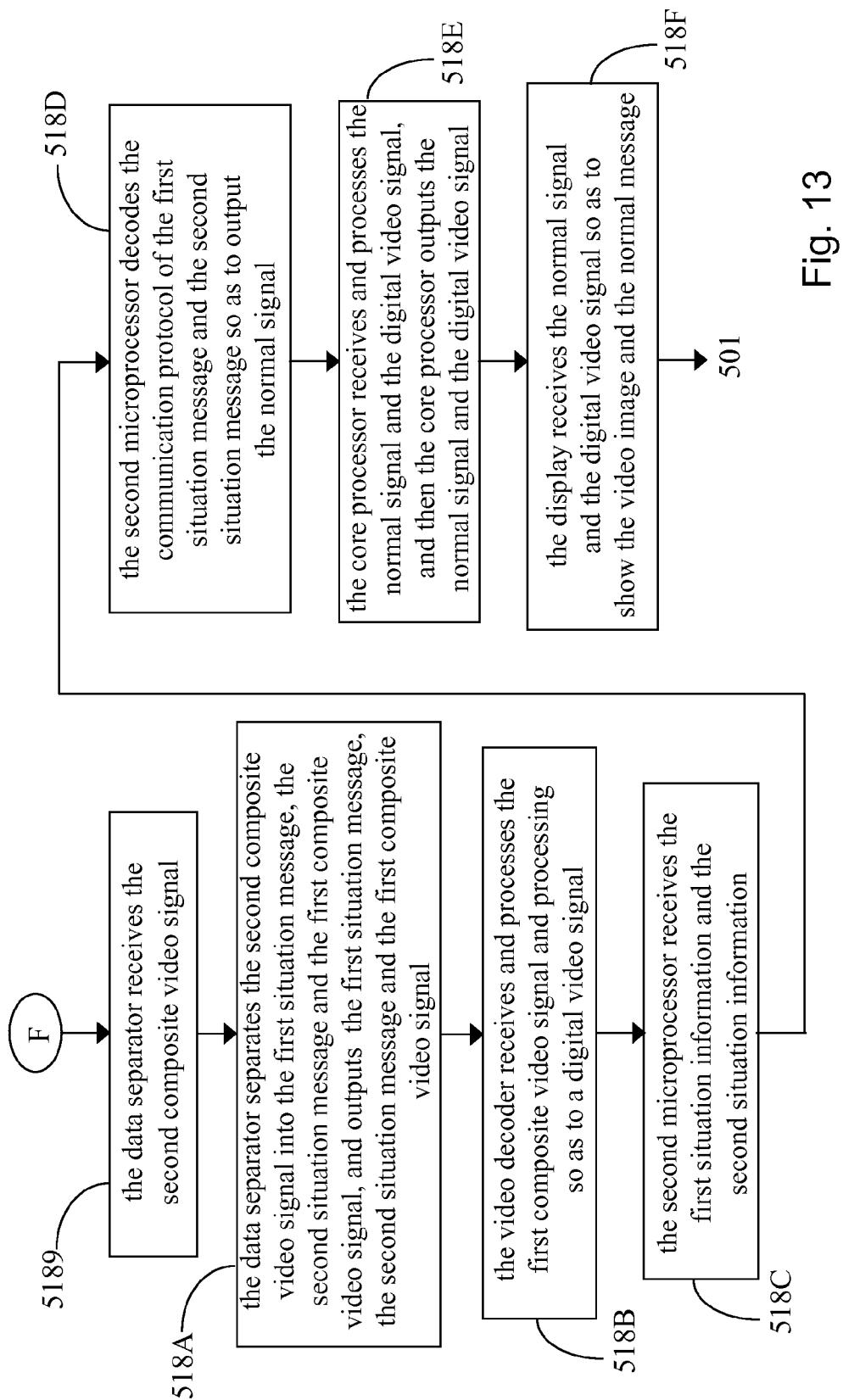

In the monitoring method for the intellectual surveillance system as above mention, when the surveillance camera 111 not detects the occurrence of the sudden situation, the method automatically executes the step (518) so as to make the periphery sensing device 113 and the state register 1111 automatically execute the message return of the normal situation. Referring to FIGS. 12 and 13, which illustrate the detailed flowchart of step (518) according to the present invention, wherein the step (518) further includes the following detailed steps:

At first, the method executes step (5180), where the state register 1111 saves and outputs the first situation message, meanwhile, the periphery sensing device detects and outputs the second situation message. Then in step (5181), the first microprocessor 112 receives the first situation message and the second situation message. Next in step (5182), the first microprocessor 112 encodes the communication protocol of the first situation message and the second situation message. The method continuously executes step (5183), where the first microprocessor 112 outputs the first situation message and the second situation message to the message register 115. Then in step (5184), the message register 115 outputs the first situation message and the second situation message. Next in step (5185), the synchronizing signal separator 114 receives and separates the first composite video signal into the horizontal synchronized signal, the vertical synchronized signal and the odd-even video field signal, so that the synchronizing signal separator 114 outputs the horizontal synchronized signal, the vertical synchronized signal and the odd-even video field signal. Next in step (5186), the data mixer 116 receives the first situation message, the second situation message and the first composite video signal. Then in step (5187), the date mixer 116 integrates the first situation message and the second situation message into the vertical blanking interval (VBI) of the first composite video signal. Next in step (5188), the data mixer 166 outputs the second composite video signal.

After completing the step (5188) described above, the camera module 11 outputs the second composite video signal to the terminal computer module 12 through the BNC connector 13 and the coaxial cable 14, so that, the method continuously executes step (5189), where the data separator 121 receives the second composite video signal. Then in step (518A), the data separator 121 separates the second composite video signal into the first situation message, the second situation message and the first composite video signal, and outputs the first situation message, the second situation message and the first composite video signal. Next in step (518B), the video decoder 122 receives and processes the first composite video signal as the digital video signal. Next in step (518C), the second microprocessor 125 receives the first situation message and the second situation message. Then in step (518D), the second microprocessor 125 decodes the communication protocol of the first situation message and the second situation message so as to output the normal signal. Next in step (518E), the core processor 123 receives and processes the normal signal and the digital video signal, and then the core processor outputs the normal signal and the digital video signal. Finally, in step (518F), the display 124 receives the normal signal and the digital video signal and shows the video image and the normal message.

Thus, the intellectual surveillance system and the monitoring method thereof according to the present invention has been disclosed above completely and clearly. In summary, the present invention has the following advantages:

1. The present invention integrates the first situation message and the second situation message into the vertical blanking interval (VBI) of the composite video signal, such that the composite video signal of the traditionally analog monitor can also transmit the non-video signal.

2. The present invention transmits the first composite video signal and the second composite video signal through the BNC connector and the coaxial cable, so that the various sudden situations detected by the surveillance camera are capable of being transmitted to the terminal computer module without any RS-485 series communication port and digital IP camera so as to complete the intellectually security monitor, thereafter, the equipment cost of the monitoring system is able to be decreased.

3. The surveillance method is able to control the monitoring system to automatically complete monitoring and reacting various sudden situations.

What is claimed is:

1. An intellectual surveillance system, comprising:
at least one monitoring module, being able to monitor and react a sudden situation, and integrating the sudden situation into a second composite video signal so as to output the second composite video signal through at least one Bayonet Nut Connector (BNC) connector and at least one coaxial cable, the monitoring module comprising:
a surveillance camera, executing monitoring and outputting a first composite video signal with a vertical blanking interval (VBI) and a video interval, wherein the surveillance camera having a state register, which saves a first situation message and a normal situation outputted from the surveillance camera, and then the state register saves the first situation message and the normal situation as the first situation message;
a periphery sensing device, being coupled to the surveillance camera and detecting the sudden situation of the surveillance camera so as to output a second situation message, the periphery sensing device also detecting the normal situation of the surveillance camera and outputting the second situation message;
a first microprocessor, be coupled to the surveillance camera and the periphery sensing device, the first microprocessor receiving the first situation message and the second situation message and encoding the communication protocol of the first situation message and the second situation message;
a synchronizing signal separator, being coupled to the surveillance camera to receive the first composite video signal and separating the first composite video signal into a horizontal synchronized signal, a vertical synchronized signal and an odd-even video field signal;
a message register, being coupled to the first microprocessor and receiving the first situation message and the second situation message dealt with the communication protocol; and
a data mixer, being coupled to the synchronizing signal separator, the surveillance camera, and the message register, the data mixer being adapted to receive the horizontal synchronized signal, the vertical synchronized signal, the odd-even video field signal, the first situation message, and the second situation message, so that the data mixer integrates and outputs the horizontal synchronized signal, the vertical synchronized signal, the odd-even video field signal, the first situation message, and the second situation message into the second composite video signal, wherein the first situation message and the second situation message are integrated into the vertical blanking interval (VBI) of the first composite video signal; and
a terminal computer module, being electrically connected to the camera module through the BNC connector and the coaxial cable in order to receive and process the second composite video signal, the terminal computer module comprising:
a data separator, being electrically connected to the data mixer to receive and separate the second composite video signal into the first situation message, the second situation message and the first composite video signal and outputting the first situation message, the second situation message and the first composite video signal;

a video decoder, being coupled to the data separator for receiving and processing the first composite video signal so as to output a digital video signal;

a second microprocessor, being coupled to the data separator to receive the first situation message and the second situation message, outputting the first situation message and the second situation message after decoding the communication protocol of the first situation message and the second situation message, simultaneously an alert signal being outputted as well, moreover, the second microprocessor being able to output a normal signal without the sudden situation;

a warning device, being coupled to the second microprocessor for receiving the alert signal and sending out an alert to warn; and a core processor, being coupled to the video decoder and the second microprocessor in order to receive the digital video signal, the normal signal and the alert signal, the core processor being adapted to process and output the digital video signal, the normal signal and the alert signal to an external display for showing video image, normal messages and alert messages;

wherein the data mixer further comprises:

a data reading gate, being electrically connected to the message register for receiving the first situation message and the second situation message;

a reading trigger, being electrically connected to the synchronizing signal separator and being coupled to the data reading gate, the reading trigger being adapted to receive the horizontal synchronized signal and the vertical synchronized signal and trigger the data reading gate to output the first situation message and the second situation message according to the period of the horizontal synchronized signal and the vertical synchronized signal;

a vertical synchronization generator, being electrically connected to the synchronizing signal separator to receive the horizontal synchronized signal and the vertical synchronized signal, so that the period of the vertical blanking interval is determined, and then the vertical synchronization generator is able to output an output control signal;

an adder, being coupled to the data reading gate and the vertical synchronization generator for receiving the first situation message and the second situation message, wherein the adder obtains the period of the vertical blanking interval (VBI) from the vertical synchronization generator and couples the first situation message and the second situation message into a synchronization signal of the VBI; and an output selecting gate, being coupled to the adder and the vertical synchronization generator to receive the horizontal synchronized signal and the vertical synchronized signal carrying the first situation message and the second situation message, the output selecting gate further receiving the odd-even video field signal and the output control signal simultaneously, so that the output selecting gate outputs the first situation message and the second situation message within the vertical blanking interval according to the output control signal.

2. The intellectual surveillance system of claim 1, wherein the display is able to receive the digital video signal and the alert signal processed by the core processor and show the video image and the alert messages, moreover, the display being capable of receiving the digital video signal and the normal signal processed by the core processor and displaying the video image and the normal messages.

3. The intellectual surveillance system claim 1, wherein the surveillance monitor is an analog monitor.

4. The intellectual surveillance system claim 1, wherein the display is selected from the group consisting of: an LCD display, an LED display, a PDP display, and a CRT display.

5. The intellectual surveillance system claim 1, wherein the sudden situation is selected from the group consisting of: a moving object being detected by the surveillance camera, the video brightness of the surveillance camera being changed, the day/night mode of the surveillance camera being switched, the capturing angle of the surveillance camera being changed, the lens of the surveillance camera being shielded, and the surveillance camera being subject to damage.

6. The intellectual surveillance system claim 1, wherein the normal situation is selected from the group consisting of: the focus situation of the surveillance camera and the periphery temperature situation of the surveillance camera.

7. The intellectual surveillance system claim 1, wherein the alert message is selected from the group consisting of: a text message, a picture message and a text-picture combination message.

8. The intellectual surveillance system claim 1, wherein the normal message is selected from the group consisting of: a text message, a picture message and a text-picture combination message.

9. A monitoring method for an intellectual surveillance system, comprising the steps of:

(1) a surveillance camera being activated for monitoring and outputting a first composite video signal;

(2) a periphery sensing device detecting the state of the surveillance camera;

(3) determining whether a sudden situation is happening, if yes, going to step (4), if not, going to step (18);

(4) determining whether the sudden situation is detected by the surveillance camera, if yes, going to step (5), if not, going to step (6);

(5) a state register saving and outputting a first situation message of the surveillance camera, going to step (7);

(6) the periphery sensing device outputting a second situation message;

(7) a first microprocessor receiving and determining the first situation message and the second situation message;

(8) determining whether the message is set up, if yes, going to step (9), if not, going back to step (1);

(9) the first microprocessor encoding the communication protocol and setting the priority process of the first situation message and the second situation message;

(10) the first microprocessor outputting the first situation message and the second situation message to a message register, and resetting the message process sequence of the message register;

(11) the message register sending out the first situation message and the second situation message firstly;

(12) a synchronizing signal separator receiving the first composite video signal and separating the first composite video signal into a horizontal synchronized signal, a vertical synchronized signal and an odd-even video field signal, then outputting the horizontal synchronized signal, the vertical synchronized signal and the odd-even video field signal;

(131) starting a reading trigger of a data mixer;

(132) the reading trigger detecting the vertical synchronized signal and counting the horizontal synchronized signal for triggering a data reading gate;

(133) the data reading gate receiving and transmitting the first situation message and the second situation message to an adder;

(134) a vertical synchronization generator determining the period of a vertical blanking interval according to the vertical synchronized signal and the horizontal synchronized signal and outputting a output control signal;

(135) the adder coupling the first situation message and the second situation message into a synchronized signal of the vertical blanking interval and sending out the synchronized signal;

(136) a output selecting gate receiving the first situation message, the second situation message, the output control signal, and the odd-even video field signal;

(137) the output selecting gate outputting a second composite video signal according to the output control signal;

(14) a terminal computer module receiving and processing the second composite video signal;

(15) a display showing video image and alert messages, and a warning device sending out an alert to warn simultaneously;

(16) determining whether the alert message is being finished, if yes, going to step (17), if not, going back to step (15);

(17) changing the setting of the terminal computer module so as to make the display merely shows the video image; and

(18) the periphery sensing device and the state register both executing the message return of a normal situation.

10. The monitoring method of claim 9, wherein the step (14) further comprises the steps of:

(141) a data separator receiving and separating the second composite video signal into the first situation message, the second situation message and the first composite video signal;

(142) the data separator outputting the first situation signal, the second situation signal and the first composite video signal;

(143) a video decoder receiving and processing the first composite video signal so as to output a digital video signal;

(144) a second microprocessor receiving the first situation message and the second situation message;

(145) the second microprocessor outputting the first situation message and the second situation message after decoding the communication protocol of the first situation message and the second situation message;

(146) the second microprocessor outputting an alert signal;

(147) a warning device receiving the alert signal and sending out an alert to warn;

(148) a core processor receiving and processing the digital video signal and the alert signal; and (149) the core processor outputting the digital video signal and the alert signal to the display.

11. The monitoring method of claim 9, wherein the step (17) further comprises the steps of:

(171) a vertical synchronization generator outputting a output control signal to an output selecting gate; and (172) the output selecting gate merely outputting the first composite video signal to the terminal computer module according to the output control signal.

12. The monitoring method of claim 9, wherein the step (18) further comprises the steps of:

(180) the state register saving and outputting the first situation message, meanwhile, the periphery sensing device outputting the second situation message;

(181) the first microprocessor receiving the first situation message and the second situation message;

(182) the first microprocessor encoding the communication protocol of the first situation message and the second situation message;

(183) the first microprocessor outputting the first situation message and the second situation message to the message register;

(184) the message register outputting the first situation message and the second situation message;

(185) the synchronizing signal separator receiving the first composite video signal and separating the first composite video signal into the horizontal synchronized signal, the vertical synchronized signal and the odd-even video field signal, so that the synchronizing signal separator outputs the horizontal synchronized signal, the vertical synchronized signal and the odd-even video field signal;

(186) the data mixer receiving the first situation message, the second situation message and the first composite video signal;

(187) the data mixer integrating the first situation message and the second situation message into the vertical blanking interval of the first composite video signal;

(188) the data mixer outputting the second composite video signal;

(189) a data separator receiving the second composite video signal;

(18A) the data separator separating the second composite video signal into the first situation message, the second situation message and the first composite video signal, and outputting the first situation message, the second situation message and the first composite video signal;

(18B) a video decoder receiving and processing the first composite video signal and processing so as to a digital video signal;

(18C) a second microprocessor receiving the first situation message and the second situation message;

(18D) the second microprocessor decoding the communication protocol of the first situation message and the second situation message so as to output a normal signal;

(18E) a core processor receiving and processing the normal signal and the digital video signal, and then the core processor outputs the normal signal and the digital video signal; and (18F) the display receiving the normal signal and the digital video signal so as to show the video image and a normal message.

13. The monitoring method of claim 9, wherein the sudden situation is selected from the group consisting of: a moving object being detected by the surveillance camera, the video brightness of the surveillance camera being changed, the day/night mode of the surveillance monitor being switched, the capturing angle of the surveillance camera being changed, the lens of the surveillance camera being shielded, and the surveillance camera being subject to damage.

14. The monitoring method of claim 9, wherein the normal situation is selected from the group consisting of: the focus situation of the surveillance camera and the periphery temperature situation of the surveillance camera.

15. The monitoring method claim 9, wherein the alert message is selected from the group consisting of: a text message, a picture message and a text-picture combination message.

16. The monitoring method claim 9, wherein the normal message is selected from the group consisting of: a text message, a picture message and a text-picture combination message.

* * * * *